Patented Oct. 18, 1932

1,883,484

UNITED STATES PATENT OFFICE

HOWARD BEATTY AND CHARLES MONGERE, OF CHICAGO, ILLINOIS, ASSIGNORS TO GLIDDEN FOOD PRODUCTS COMPANY, OF CHICAGO, ILLINOIS

EDIBLE COATING FOR FROZEN PRODUCTS

No Drawing. Application filed August 14, 1929. Serial No. 385,963.

The present invention relates to a new and novel composition of matter to be used for edible purposes and a new process for manufacturing the same, being in the nature of a confection, adapted especially to form a continuous coating for ice cream or frozen milk products equivalent to ice cream products, and which are sold in a frozen condition.

The present application is a continuation in part of our application Serial Number 282,504, filed June 2, 1928, and now issued as Patent #1,796,825.

Generally speaking, our new product is soft but not mobile at ordinary room temperature, although hard and brittle when in contact with, and acting as a coating for, frozen ice cream, thus having self-sustaining properties.

This confection product may also contain small discrete chopped pieces of nut meats, which are supported in the coating by the congealing of the continuous medium of the material in which the discrete pieces of chopped nut meats are embedded when in contact with frozen ice cream.

The confection in which the pieces of chopped nuts are embedded is preferably made of finely comminuted fibre of heated or roasted nuts in combination with fatty materials and other ingredients, which aid its self-sustaining properties when it is applied to the frozen ice cream.

In preparing the product we preferably employ a nut base in the form of a pasty mass to which is added a suitable amount of a hard edible neutral fat such as cocoanut oil, palm kernel oil, or their stearines, or other fats having the general character of such constituents, together with milk powder and sweetening matter such as sugar to give desired flavor.

Ice cream when dipped in a coating material of this kind quickly congeals and a protective covering is formed thereby for the said ice cream, and the presence of the peanut oil is an advantage in that it serves to break the hard brittle nature of cocoanut oil and makes it more easily melted at the temperature of the mouth. Where desired, the brittle coating may be used to provide a firm sustaining wall.

We do not wish to be confined to the use of peanuts in either the coatings or the icing, but we may substitute nut meats, other than peanuts, such as filberts, walnuts, and others. Where the coating is to be used on a frozen, chilled, or cold product, we allow the natural oil to remain and add cocoanut oil, palm kernel oil or soft stearines as a diluent for the peanut or other nut mass in addition to the natural oil present in the peanut or other nut butter of the coating, or besides or in lieu of the oils mentioned, additional peanut oil may be added as a diluent to produce a satisfactory coating for ice cream, ice cream bars or other frozen products.

The use of dry milk is not necessary in order to accomplish the results specified, but it is placed in the composition to lend richness thereto. The use of sugar is to sweeten the mixture and make it more palatable.

In order to produce the desired results, the ratio of nut fibre to the total fatty material present in the ultimate product of the continuous, smooth, soft nut mass including the additional fatty material and other incorporated powders should preferably be materially less than that present in peanut butter, or a product resembling peanut butter in its properties, and that the consistency of the product should be such that when warmed to a temperature of about 80 to 90 degrees Fahrenheit, will have fluidity and continuity and when this soft flowing product is brought in contact with frozen ice cream or other similar frozen products, will solidify to a non-tacky, non-sticky, brittle coating with self-sustaining properties.

In practice, we preferably carry out our invention by taking peanuts, shelling them, blanching them and roasting them to a temperature sufficiently high to expel the moisture and to effect certain decomposition in the peanut constituents and produce the specific nut flavor.

This product is then finely ground and comminuted to form a pasty mass which contains the natural amount of peanut oil, that is, approximately 45 to 48 per cent of peanut oil and the remainder in the form of nut fibre consisting principally of protein, crude fibre and other carbohydrates and other constituents of the nut excluding the oils.

About forty (40) parts of this pasty roasted peanut butter mass is mixed with about twenty-five (25) parts of cane sugar and about eight (8) parts of dried skim milk powder.

To this mass is added about twenty-seven (27) parts of cocoanut or palm kernel stearine in a melted condition and the entire mass kneaded into a dough and put through chocolate finishing rolls or other macerating machinery and macerated until a uniform, homogeneous product is obtained.

In order to obtain the best results, it is advisable to add the melted hardened fat in two stages; one-half is added first to the mixture of peanut paste, sugar and dry milk powder and the rest kneaded to a stiff paste and run through chocolate rollers or other milling machinery in order to incorporate and disperse uniformly the various non-fatty materials into the fatty mixture.

The other half of the hardened fat is then added in a melted condition and mixed thoroughly. The addition of the second portion of the fat thins out and dilutes the continuous oil phase, in which the other solid powdery constituents are dispersed.

The amount of fat added is of great importance as it governs the fluidity of the product when raised above room temperature so as to make it fluid when it is applied as a coating for frozen ice cream.

It is desirable that the total amount of fat should be essentially in excess of the peanut fibre. In the above example, there are about nineteen (19) parts of peanut fibre to about forty-seven (47) parts of fatty materials, while in ordinary peanut butter, the ratio of peanut fibre to peanut oil is approximately one to one.

In our product, we prefer to have approximately from two to three times as much fatty material as that of peanut fibre. It is desirable that the finished product should contain about 15 per cent of peanut fibre. It is also desirable that the fatty material in the composition should have an approximate solidifying or setting point of about 75 degrees Fahrenheit or thereabouts so that it will set to a hardened, brittle, self-sustaining coating on the frozen ice cream and not be tacky or sticky.

We do not limit ourselves to the above exact proportions. The object of the invention is to produce a confection which will lend itself to be used as an ice cream coating having a roasted, nutty flavor, containing a relatively smaller proportion of roasted nuts such as peanuts and a relatively much larger proportion of fatty material of the proper melting point and setting point, the latter two being in suitable proportion so that the final product is of such physical consistency that when the product is brought to the softening or melting point, it should have continuous flow without separation of constituents, and when coated on ice cream, either by dipping the ice cream in it or otherwise applying it, should solidify to a hard brittle mass without being tacky or sticky.

We can use any nut fibre such as filbert, walnut, peanut and fibre of other nuts.

We may also desire to have discrete macroscopic pieces of nut meat embedded in said confection coating material, said discrete pieces of nut meat to vary in size from the size of a pea to ¼ of a pea to be coated by the macerated confection.

Such coating of the hardened fat will protect the discrete pieces of nut meat, which are embedded therein and prevent same from deteriorating such as by oxidation and other forms of spoilage, besides the continuous phase of the hardened fat serves as a structure to keep the discrete particles of nut meat in position and adjacent to the ice cream.

What we claim as new and desire to protect by United States Letters Patent is:—

1. As an article of manufacture, a composition of matter suitable for coating ice cream and frozen products comprising nut fibre, powdered skim milk, powdered sugar material, and fatty materials above a melting point of 76 degrees Fahrenheit in sufficient proportion to produce a product, in which the fatty material is substantially from two to three times that of the nut fibre and in which the melting point of the total fat in the finished product is less than 100 degrees Fahrenheit, the coating product being relatively soft at room temperature whereby when it is employed as a coating for a frozen product, said coating will melt substantially readily at the mouth temperature.

2. As an article of manufacture, a composition of matter suitable for coating ice cream and frozen products, including roasted peanut butter and a substantial amount of cocoanut stearine and dried skim milk powder, the materials added to the peanut butter being sufficient to produce a plastic product at ordinary room temperature, but which when heated to a higher temperature has a liquid consistency for application as a coating to a frozen product and there solidifies to a brittle mass, the coating product being relatively soft at room temperature whereby when it is employed as a coating for a frozen product, said coating will melt substantially readily at the mouth temperature.

3. As an article of manufacture, a composition of matter suitable for coating ice cream and frozen products, comprising approximately 40 parts of a plastic nut product, 25 parts cane sugar, 8 parts of dried skim milk powder, and 27 parts cocoanut stearine, the coating product being relatively soft at room temperature whereby when it is employed as a coating for a frozen product, said coating will melt substantially readily at the mouth temperature.

4. As an article of manufacture, a composition of matter suitable for coating ice cream and frozen products, comprising approximately 40 parts of a plastic nut product, 25 parts cane sugar, 8 parts of dried skim milk powder, and 27 parts edible fatty material of a character adapted to produce a composition which when applied as a coating to a frozen product will harden to a brittle mass, the coating product being relatively soft at room temperature whereby when it is employed as a coating for a frozen product, said coating will melt substantially readily at the mouth temperature.

5. The process of manufacturing a composition of matter suitable for coating ice cream and frozen products including adding to a macerated nut product a sufficient amount of sweetening matter to give the desired taste to the ultimate product, incorporating a sufficient amount of edible powdered matter to reduce the pasty consistency, and incorporating a sufficient amount of cocoanut stearing to produce an ultimate product plastic at room temperature but fluid at higher temperature for application as a coating to the frozen product and adapted to then harden to non-tacky brittle mass, the coating product being relatively soft at room temperature whereby when it is employed as a coating for a frozen product, said coating will melt substantially readily at the mouth temperature.

In witness whereof, we hereunto subscribe our names this 8th day of August, 1929.

HOWARD BEATTY.
CHAS. MONGERE.